I. B. QUINBY.
Fish-Decoy Lamp.

No. 51,120. Patented Nov. 21, 1865.

Witnesses.
Frederick Curtis
J. P. Hale Jr.

Inventor
Ira B. Quinby.
by his attorney
R. H. Eddy.

UNITED STATES PATENT OFFICE.

IRA B. QUINBY, OF EAST BOSTON, MASSACHUSETTS, ASSIGNOR TO HIMSELF AND EDWARD LOW, OF YORK, MAINE.

FISH-DECOY.

Specification forming part of Letters Patent No. 51,120, dated November 21, 1865.

*To all whom it may concern:*

Be it known that I, IRA B. QUINBY, of East Boston, in the county of Suffolk and State of Massachusetts, have invented a new and useful fish-decoy or apparatus to float on the surface of the sea or water containing fish, and particularly to be placed within or attached to a net when set for catching fish; and I do hereby declare the said invention to be described in the following specification and represented in the accompanying drawings, of which—

Figure 1:
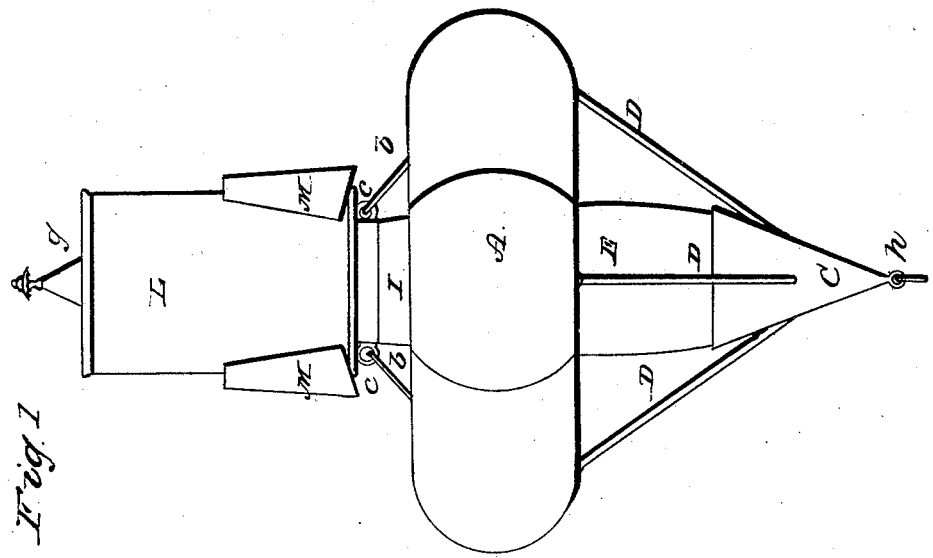
Figure 2:
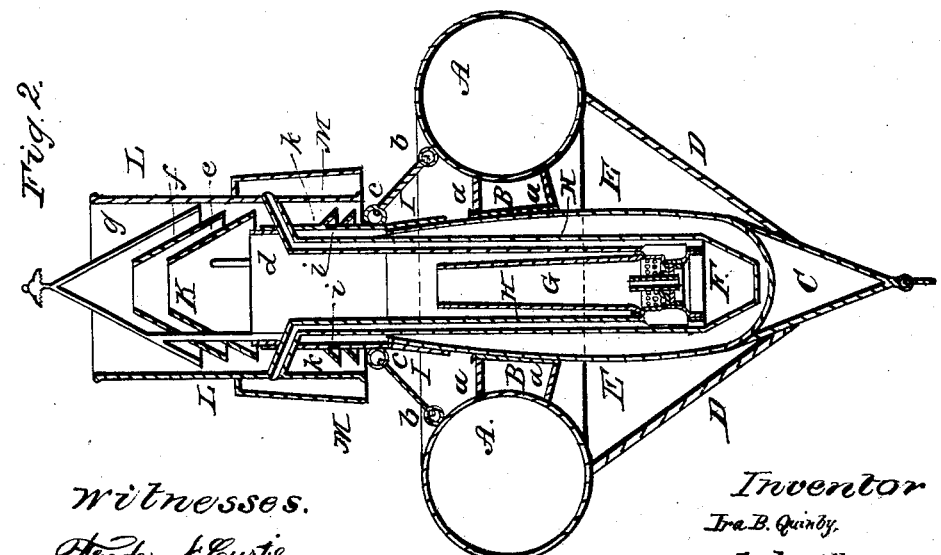

Figure 1 is a side elevation, and Fig. 2 a vertical section, of it.

The object of the said apparatus or decoy is to introduce a strong light or flame just beneath the surface of the water or sea, in order that the rays proceeding from such flame may penetrate and illuminate the water in various directions, in order that fish may be attracted thereby; and, furthermore, another object of my apparatus is to prevent the waves or swell of the sea from extinguishing the said flame.

In carrying out my invention I make use of a glass or transparent vessel, E, closed at bottom and open at top, and having the form, in vertical section, as exhibited in Fig. 2. To this vessel I apply an annular float, A, by means not only of a conical stop or socket, C, connected with the float by any suitable number of rods D, but by an annulus or conical tube, B, which encompasses that part of the vessel E, and is connected to the float by a series of rods, *a a*, the whole being arranged as shown in Figs. 1 and 2.

A tubular cap, I, fits on the upper part or around the mouth of the glass vessel E, and is kept in place thereon by hooks *b b*, jointed to the float and hooked into eyes *c c* extending from the cap I. From the said cap I, and by means of two tubes, H H, a kerosene or other proper lamp is suspended within the glass vessel E, in manner as shown in Fig. 2. The glass chimney of the burner of such lamp is exhibited at G. Each of the tubes H, where it runs alongside of the burner of the lamp, is cut, notched, or perforated, so as to allow air to pass out of it and to the burner, in order to supply the latter with the necessary oxygen. The tubes H H, near their upper ends, branch or are bent and go through the cap-tube I, and to and open through a guard-tube, L, which is arranged concentrically around the cap-tube I, and besides extends above it, in manner as shown in Fig. 2. The mouth of the tubes H H is covered or protected by a hollow semi-conic frustum, M, which is closed at top and open at bottom, and is affixed to the external surface of the cylindrical guard-tube L. Furthermore, there is placed in the upper end of the cap I, and within the guard L, a current-ventilator, K, formed of a hollow cap-cone, *g*, two hollow conic frustra, *e f*, and a short tube or annulus, *d*, the latter being made to fit to the upper part of the tube I. The arrangement of the parts *d e f g*, composing the ventilator, is such as is shown in Fig. 2, their several parts being duly joined and supported in place by connections extending from one to the other of them.

In the operation of the fish-decoy so made air for the lamp will pass into the shields M M, and thence into and down through the tubes H H, by which it will be discharged into the lower part of the glass vessel E. The smoke and gases from the chimney will flow upward and out of the vessel E, and through the cap-tube I and the ventilator K, from whence they will be discharged into the guard L, and will readily escape therefrom. While the ventilator operates to prevent water from descending into the cap I and falling within the vessel E, the guard L not only enables any water which may enter its upper end to escape out of its lower end, but it protects the openings of the ventilator from lateral currents of water. The shields M M also protect the mouths of the air-tubes H H from such currents or waves of water. The float A, which may be made of metal or other suitable material, answers to support within the water all that part of the apparatus which may be below its plane of flotation.

One or more openings, *i*, are made through the cap-tube I, and covered by a tunneled cone or guard, *k*, arranged as shown in Fig. 2, such openings being for the purpose of aiding in supplying air to the lamp, or producing one or more currents of it down against the main surface of the glass E.

A small ring, *h*, applied to the apex of the conical socket C, serves as a means by which, with a string, a fisherman is enabled to connect the decoy to a net.

If desirable, a rod may be fastened to and extended from the lower part of the cone C, and have a weight attached to the other end, such being to effectually prevent the apparatus from being overset by the waves.

The rods D D and the cone C, besides performing the office of supporting the glass vessel E, serve as protections to the glass, or to prevent it from being broken by contact with rocks or objects in the water.

I claim as my invention in the above-described apparatus—

1. The combination of the float A, the glass vessel E, and the lamp arranged within the said vessel.

2. The combination of the socket or cap C, and the series of rods D D, or the equivalents thereof, with the float A, the glass vessel E, and the lamp placed or suspended therein.

3. The combination of the cap I and the air-tubes H H with the lamp F and the glass vessel E.

4. The combination of the cap I and the air-tubes H H with the lamp F, the glass vessel E, and the float A for supporting such vessel.

5. The combination of one or more shields, M M, with the air-tubes H H, the lamp F, and the glass vessel E.

6. The combination of the ventilator K and its guard L with the cap-tube I, the glass vessel E and the lamp suspended therein.

7. The combination of the conical guard K and the air opening or openings $i$ with the cap I, the glass vessel E, and the lamp F arranged in such vessel.

IRA B. QUINBY.

Witnesses:
R. H. EDDY,
F. P. HALE, JR.